Figure 1:
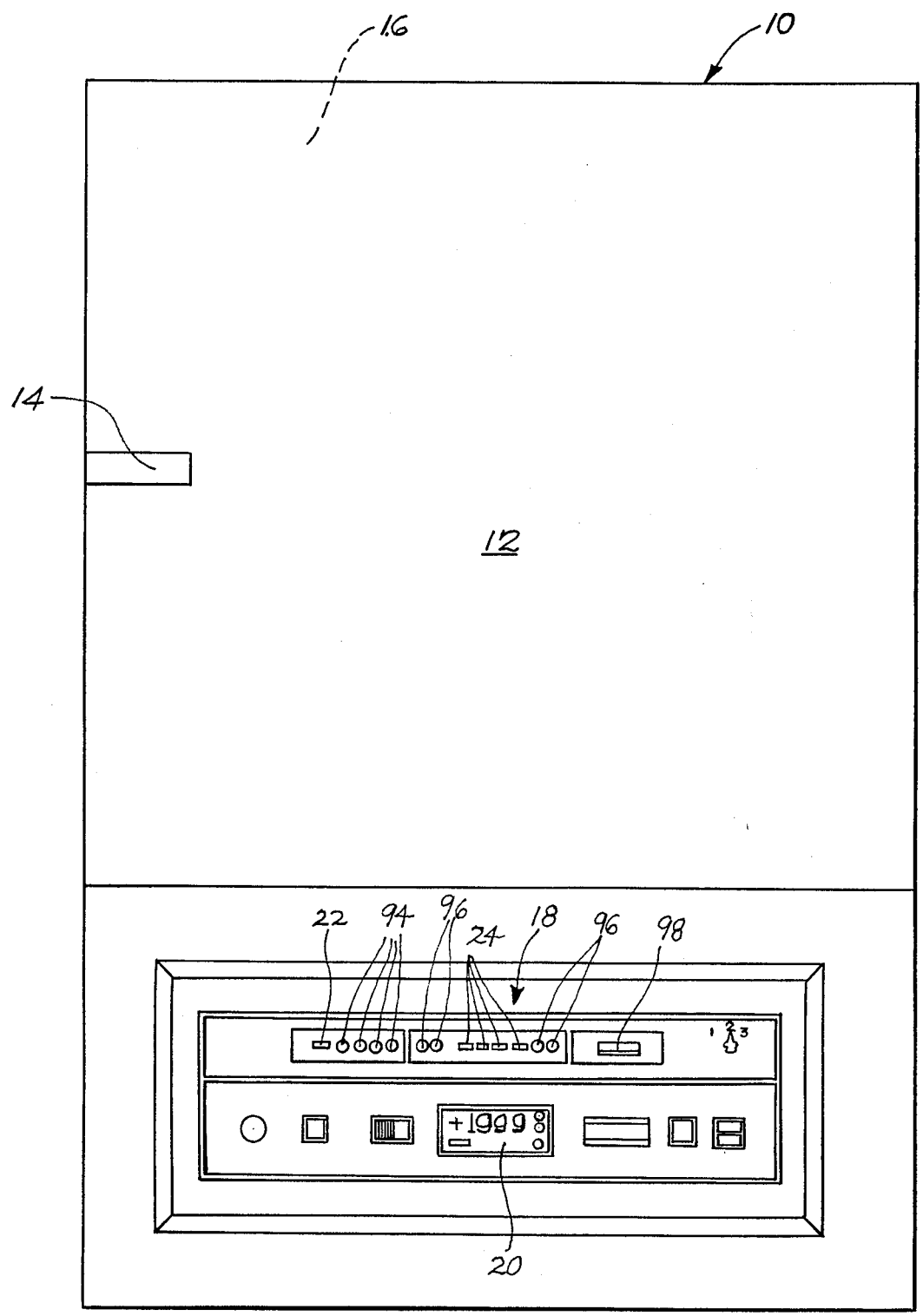

United States Patent [19]

Bare et al.

[11] Patent Number: 4,459,467

[45] Date of Patent: Jul. 10, 1984

[54] TEMPERATURE CONTROLLED OVEN WITH MULTIPLE PRESET TEMPERATURES

[75] Inventors: Duward J. Bare, Lynwood; George Dixey, Chicago, both of Ill.

[73] Assignee: General Signal Corporation, Stamford, Conn.

[21] Appl. No.: 408,760

[22] Filed: Aug. 17, 1982

[51] Int. Cl.³ ............................................. H05B 1/02
[52] U.S. Cl. .................................... 219/413; 219/508; 219/510; 374/166; 374/171
[58] Field of Search ............... 219/413, 497, 209, 504, 219/210, 505, 510, 508, 509, 510, 490, 491, 501; 236/46 R, 46 F, 1 R; 73/342, 339 R

[56] References Cited

U.S. PATENT DOCUMENTS

| | | | |
|---|---|---|---|
| 3,392,268 | 7/1968 | Bare et al. | 219/499 |
| 4,300,037 | 11/1981 | Padden | 219/497 |
| 4,323,763 | 4/1982 | Goldsmith | 219/497 |

Primary Examiner—M. H. Paschall
Attorney, Agent, or Firm—Burmeister, York, Palmatier, Hamby & Jones

[57] ABSTRACT

A controlled temperature oven provided with a pyrometer having a temperature sensitive resistance, an electrical heating element, a nonlinear heat sensing element within the oven chamber, and a variable power supply electrically connected to the heating element, the variable power supply being controlled in response to the nonlinear heat sensing element, and a switch assembly having a plurality of pairs of single pole double throw switches with a common actuation member for each pair of switches, one switch of each pair being connected in a first cascade of switches and the other switch of each pair being connected in a second cascade of switches, the switches of the first cascade of switches connecting one of a plurality of manually adjustable resistors to the variable power supply to control the output thereof, and the switches of the second cascade of switches connecting one of a plurality of variable resistors to the pyrometer to indicate the temperature selected by the switches of the first cascade of switches.

7 Claims, 2 Drawing Figures

TEMPERATURE CONTROLLED OVEN WITH MULTIPLE PRESET TEMPERATURES

The present invention relates to controlled temperature ovens for laboratory and similar uses, and particularly to temperature selection devices for such ovens.

Temperature controlled ovens suitable for laboratory and similar uses generally utilize a proportional type temperature control, that is, a control which changes the rate heat is supplied to the oven chamber in direct proportion to the temperaure difference between the oven chamber temperature and the desired temperature. The most common temperature control of this type uses a well-known alternating current phase-controlled silicon controlled rectifier circuit, as described for example in U.S. Pat. No. 3,392,268 of the present inventors entitled OVEN AND TEMPERATURE CONTROL SYSTEM THEREFOR. Such temperature controls utilize a circuit having an input provided by an oven temperature sensing element and an output which varies with deviation in oven temperature from a desired preset temperature to provide a feedback signal which alters the duration of the conduction of a silicon controlled rectifier switching circuit, thereby increasing or decreasing the power applied to the oven heating element to approach the preset temperature.

In the above mentioned patent, the oven temperature sensing device is a thermistor, and a thermistor does not produce an electrical output which is linear with temperature changes. While electrical outputs which are linear with temperature changes can be achieved by means of a thermocouple temperature sensing element, such as described in U.S. Pat. No. 3,632,985 of the present inventors entitled THERMOCOUPLE BRIDGE TEMPERATURE CONTROL, linear temperature control systems are inherently more expensive.

An oven temperature control system which utilizes a relatively inexpensive current-controlling element whose characteristics vary with temperature, such as a thermistor, can be utilized to maintain relatively constant oven temperatures, but requires calibration of the temperature selecting scale. Special devices have been developed to facilitate use of non-linear temperature sensing devices for the control of temperature in ovens. U.S. Pat. No. 3,247,701 of Joseph A. Lawler entitled METHOD AND APPARATUS FOR CORRECTING CALIBRATION ERRORS provides a dial mechanism which is designed to accommodate the non-linearity of the temperature sensing element and to permit direct setting of the temperature of the oven over a wide range of temperatures.

A thermistor, or other similar current controlling element with non-linear characteristics, does achieve stable oven temperature when incorporated in a proper temperature control system. The present invention is directed to a simplified control system for selecting one of a plurality of different temperatures of an oven utilizing a temperature control system with a non-linear temperature sensing element. More particularly, the present invention seeks to permit selection of a plurality of temperatures for an oven which utilizes a non-linear temperature sensing thermistor in a temperature control system by means of a push button actuator.

It is conventional practice to provide a laboratory or industrial oven with an oven temperature pyrometer which continuously indicates the temperature of the oven chamber. In accordance with the present invention, the oven temperature control system is provided with a plurality of switches for the selection of different temperatures for the oven, and the meter of the oven temperature pyrometer is utilized on a time sharing basis to read the selected temperature. Hence, the oven temperature pyrometer not only indicates the temperature of the oven chamber, but also the selected temperature for the oven chamber among a plurality of different switch selected temperatures. For the utmost in convenience, a digital oven temperature pyrometer is utilized permitting the selected temperature switches to be read out digitally.

Figure 2:
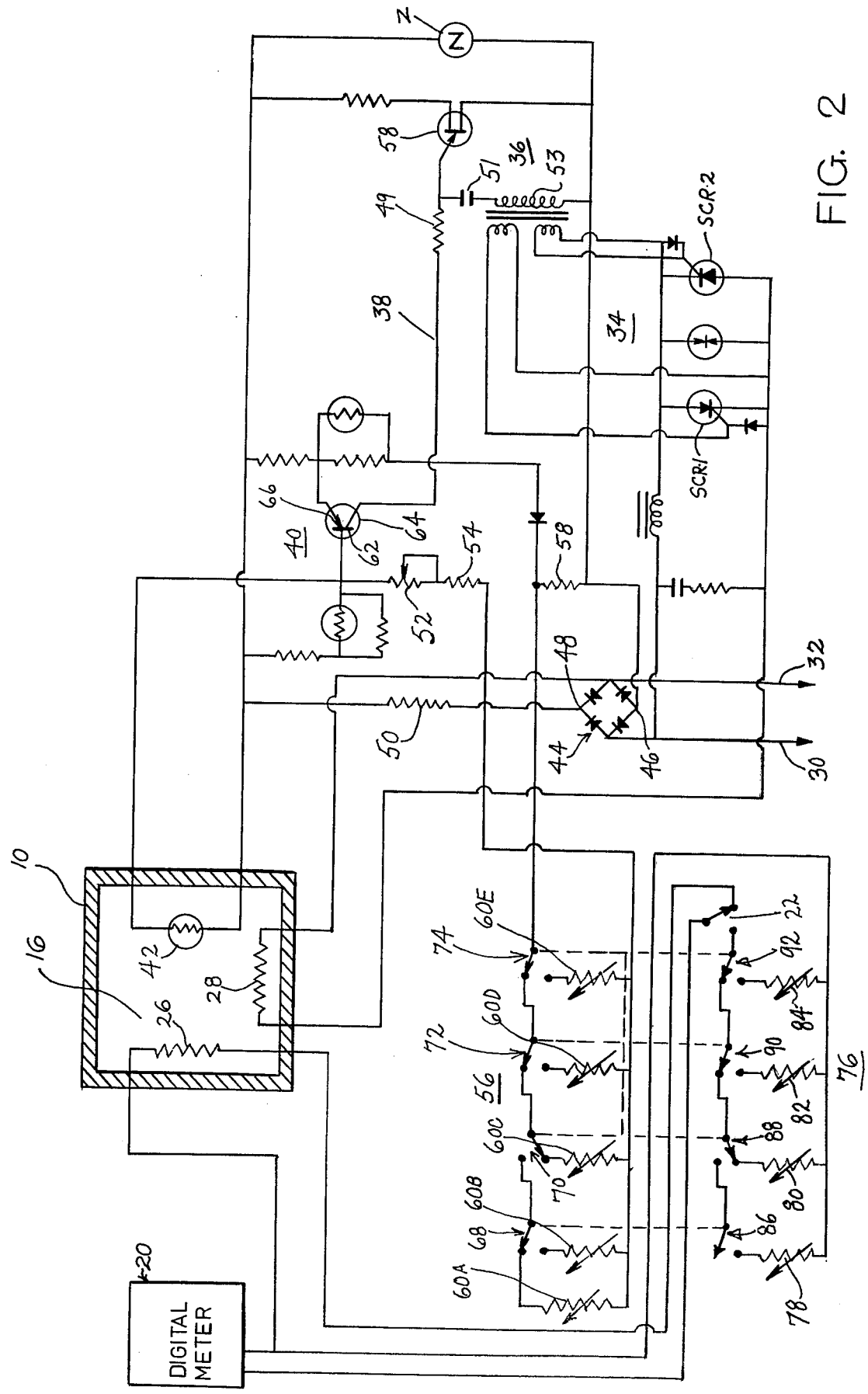

The foregoing advantages of the present invention, together with further aspects thereof, will best be understood from consideration of the embodiment illustrated in the drawings, in which:

FIG. 1 is a front elevational view of an oven constructed according to the teachings of the present invention; and FIG. 2 is a schematic electrical circuit diagram of the oven control system utilized in the oven of FIG. 1.

As illustrated in FIG. 1, the oven has a housing 10 provided with a door 12 with an opening mechanism 14. Within the door 12 is the oven chamber 16. Beneath the oven chamber 16, a compartment houses the temperature control system 18 which maintains the temperature of the oven at its desired level. The temperature control system 18 has a digital meter 20 which is a part of a pyrometer which measures the temperature of the chamber 16 and reads out digitally. Further, the temperature control system is provided with a push to read switch 22 and a plurality of temperature selecting switches 24, which will be more fully described hereinafter, and when one of the temperature selecting switches 24 is depressed at the same time the push botton switch 22 is depressed, the meter 20 will read the selected oven temperature.

FIG. 2 schematically illustrates further details of the controlled temperature oven of the present invention, the housing 10 and chamber 16 being shown schematically. The pyrometer is also illustrated with the meter 20 and a linear temperature sensing element 26 located in the chamber 16. The meter 20 is a current response device, and it is connected in series with the temperature sensing element 26 and the push button switch 22. The temperature sensing element 26 generates a current in this circuit corresponding to the temperature when the switch 22 is in the closed (released) position to cause the digital meter 20 to read-out digitally.

A resistance type heating element 28 is mounted within the housing 10 for the purpose of heating the chamber 16. The heating element 28 is connected in series with alternating current power lines 30 and 32 and a conventional phase-controlled switching circuit 34. The switching circuit 34 has a firing circuit 36 and two oppositely poled silicon-controlled rectifiers SCR 1 and SCR 2 which are responsive to the firing circuit 36 and made alternately conductive for a variable portion of each half cycle of alternating current. The firing circuit 36 controls the duration of each period of conduction depending upon the magnitude of the input pulses to the firing circuit 36 on lead 38. Lead 38 is responsive to the output of a transistor circuit 40 which in turn responds to the output of thermistor 42.

The alternating current power lines 30 and 32 are connected across a full wave rectifier 44 which produces a direct current potential between the negative terminal 46 and the positive terminal 48. This direct current potential fluctuates at the frequency of the alternating current power input on lines 30 and 32, thus causing Zenier diode Z to periodically conduct to produce a clipped D.C. pulse to the firing circuit 36 and amplifier 40. The magnitude of the pulses from the amplifier 40 on line 38 are integrated by resistor 49 and capacitor 51 to produce a ramp voltage pulse on the emitter of unijunction transistor 53, thus causing conduction through the primary winding of transformer 53 in each half-cycle at a time determined by the magnitude of the pulse on line 38. In this manner, the period of conduction of SCR 1 and SCR 2 is controlled, as more fully described in U.S. Pat. No. 3,392,268.

One terminal of the thermistor 42 is connected to the positive terminal 48 of the full wave rectifier 44 through a resistor 50. The other terminal of the thermistor 42 is connected to the negative terminal 46 of the full wave rectifier through a calibration potentiometer 52, a resistor 54, a switching circuit 56, and a resistor 58. Depending upon the switch selection of the switching circuit 56, one of five resistors 60A, 60B, 60C, 60D or 60E is connected in the series circuit of the thermistor between the positive and negative terminals of the full wave rectifier 44.

Since the base 62 of the transistor 64 of the transistor circuit 40 is connected between the potentiometer 52 and the thermistor 42, the potential of the base with respect to the emitter 66 is determined by the current flow through the series circuit including the thermistor 42, the potentiometer 52, the resistors 54 and 58, and the adjustable resistors of the switching circuit 56, and the relative magnitude of the resistance of the thermistor to the total of the other resistors in the series circuit. Hence, the potential on the base 62 of the transistor 64 can be changed by changing the magnitude of the resistance of the switching circuit 56.

One terminal of all five of the resistors 60A, 60B, 60C, 60D and 60E is interconnected and connected to the resistor 54. The other terminal of resistors 60B, 60C, 60D, and 60E is connected to one of the stationary contacts of a single pole double throw switch, the switches being designated 68, 70, 72 and 74, respectively. The pole terminal of switch 74 is connected to the terminal of resistor 58 opposite the ground terminal 46, and the other stationary terminal of the switch 74 is connected to the pole terminal of switch 72. In like manner, the other stationary terminal of switch 72 is connected to the pole terminal of switch 70, and the other stationary terminal of switch 70 is connected to the pole terminal of switch 68. The other stationary terminal of switch 68 is connected to the terminal of resistor 60A opposite the resistor 54.

A second switching circuit 76 is connected to the meter 20 and includes a second stationary terminal of single pole double throw push button switch 22. The second switching circuit 76 has four resistors 78, 80, 82 and 84, and one terminal of each of these resistors is interconnected and connected to the junction of the temperature sensing element 26 and meter 20. The other terminal of each of the resistors 78, 80, 82 and 84 is connected to a stationary terminal of a single pole double throw switch, the switches being designated 86, 88, 90 and 92. The pole terminal of switch 92 is connected to one second stationary terminal of the push button switch 22. The other stationary terminal of switch 92 is connected to the pole terminal of switch 90. In like manner, the other stationary terminal of switch 90 is connected to the pole terminal of switch 88, and the other stationary terminal of switch 88 is connected to the pole terminal of switch 86. Further, switch 86 is ganged for actuation with switch 68 of the switching circuit 56, switch 88 is ganged with switch 70 of the switching circuit 56, switch 90 is ganged with switch 72, and switch 92 is ganged with switch 74.

As stated above, when the push button switch 22 is not depressed (as shown in FIG. 2), the meter 20 is connected through the switch 22 in series with the temperature sensing element 26, and the meter 20 functions as a pyrometer and reads the temperature of the chamber. When the switch 22 is depressed, the pole terminal is connected to the pole terminal of switch 92, and one of the resistors 78, 80, 82 or 84 is connected in the circuit. As illustrated in FIG. 2, resistor 80 is connected in the circuit, and the meter will respond to the resistance of resistor 80, rather than the resistance of temperature sensing element 26. All of the resistors 78, 80, 82 and 84 are variable resistances, and thus the resistor 80 may be adjusted to cause the meter 20 to read whatever temperature is desired for the oven chamber 16.

In like manner, resistors 60B, 60C, 60D, and 60E are variable resistors. Since the switch 88 is ganged with the switch 70, resistor 60C is in the temperature control circuit at the same time that resistor 80 is in the circuit of meter 20. Hence, resistor 60C may be adjusted to change the temperature of the oven 16 to that temperature calibrated on the meter 20 by the resistor 80. Calibration of resistor 60C to the desired temperature is achieved by releasing the push button 22 and adjusting resistor 60C until the pyrometer 20 reads the selected temperature.

The switches 68, 70, 72 and 74 are a mechanical assembly which automatically permits only one resistor to be connected in the circuit at a given time, that is resistor 60C as illustrated in FIG. 2. Depressing one of the buttons 24 on the temperature control system 18 to actuate switch 68, 72, or 74 will cause switch 70 to switch to the opposite stationary contact. In like manner, switches 86, 88, 90 and 92 are mechanically interconnected to permit only one of the resistors of the meter circuit to be in the circuit at a given time, namely resistor 80 in FIG. 2. Closing of any one of the switches 86, 90 or 92 will automatically reverse the position of switch 88 to the other stationary contact.

The resistors 78, 80, 82 and 84 are adjustably by rotation of a shaft, and the end of the shaft of each of these resistors is accessible from the front panel as indicated by the reference numeral 94 in FIG. 1. Likewise, the resistors 60B, 60C, 60D, and 60E are adjustable by rotation of a shaft the end of which is accessible on the front panel as indicated by the reference numeral 96. The resistor 60A, however, is adjustable by means of a rotating wheel 98, also accessible on the front panel. When none of the actuators for the switches 24 are depressed, resistor 60A is connected between resistors 54 and 58, and this resistor may be manually adjusted by means of the wheel 98 from the front panel. The temperature of the chamber 16 will be read by the meter 20. The meter 20 is a digital meter so that the temperature of the chamber 16 and the selected temperatures to be recalled by the switches 68, 70, 72 and 74 are read out digitally.

The present invention has applications beyond those of temperature controlled ovens, and those skilled in the art will readily devise uses for the present invention in addition to the use here disclosed. For example, the principles of the invention may also be applied to furnaces or other devices where such temperature control is desirable. In addition, modifications may be made to the structure set forth in this specification. It is therefore intended that the scope of this patent should not be limited by the particular embodiment and specific instruction herein illustrated and described, but should extend to all forms of the invention as defined by the appended claims.

The invention claimed is:

1. In a controlled temperature apparatus having
  (a) a chamber, the temperature of which is to be controlled,
  (b) a resistance heating element in thermal communication with the chamber,
  (c) variable power-supply means electrically connected to the resistance heating element having a first and a second input terminal for a manually adjustable electrical control element for controlling the output of said power supply,
  (d) and a pyrometer having a current responsive meter and a first and a second input terminal for receiving a temperature sensing resistance element located within the chamber for sensing the temperature of the chamber, the improved apparatus wherein the variable power supply means includes
  (e) a plurality of manually adjustable electrical control elements having first and second terminals, in combination with
  (f) a plurality of manually adjustable electrical resistance members having first and second terminals,
  (g) electrical switch means having two groups of electrically isolated single pole double throw switches, each switch of said means having a pole terminal and two stationary terminals, the switches of one group being connected in cascade with the pole terminal of each switch of said group excepting the last switch in said cascade being connected to one of the stationary terminals of the next switch of said cascade, the other stationary terminal of each switch of said first group being electrically connected to one terminal of one of the plurality of manually adjustable electrical control elements, the second terminal of each of said control elements being interconnected and electrically connected to the first input terminal of the variable power supply means, the pole terminal of the last switch of said cascade being electrically connected to the second input terminal of said variable power supply means, the switches of the second plurality being electrically connected in a second cascade with the pole terminal of each switch of the second plurality except the last switch of said second cascade being electrically connected to one of the stationary terminals of the next switch in said second cascade, the other stationary terminal of each switch of said second group being electrically connected to one terminal of one of the variable resistance members, the second terminals of said resistance members being interconnected and electrically connected to the first terminal of the pyrometer, and
  (h) electrical connection means connecting the pole terminal of the last switch in said second group to the second input terminal of the pyrometer.

2. A controlled temperature apparatus comprising the combination of claim 1 wherein the first and second groups of switches have the same number of switches, and each of the switches of the first group is mechanically ganged to one of the switches of the second group.

3. A controlled temperature apparatus comprising the combination of claim 2 wherein each switch of the one group is provided with an actuator, and means responsive to the actuator for switching one switch said group to connect the pole terminals to the second terminal of said sw ch and for switching the other switches of said group to connect the pole terminals of said other switches to the first terminals of said other pairs of switches.

4. A controlled temperature apparatus comprising the combination of claim 1 wherein the electrical connection means to the pyrometer comprises a switch having a pole terminal and two stationary terminals, the pole terminal being electrically connected to the pyrometer, the temperature sensing resistance of the pyrometer being electrically connected between the meter and one of the stationary terminals of said switch, the other stationary terminal of said switch being electrically connected to the pole terminal of the last switch of the second cascade of switches.

5. A controlled temperature apparatus comprising the combination of claim 1 wherein the first stationary terminal of the first switch in the first cascade of switches is electrically connected to the first terminal of a manually variable resistor, the second terminal of said variable resistor being electrically connected to the first input terminal of the variable power supply means.

6. A controlled temperature apparatus comprising the combination of claim 1 in combination with a temperature sensing element disposed within the oven chamber, and means electrically connected to the temperature sensing element and the variable power supply for varying the power impressed on the resistance element inversely with the deviation of the temperature of the chamber from the temperature established by the manually adjustable control elements.

7. A controlled temperature apparatus comprising the combination of claim 6 wherein the temperature sensing element produces an electrical output which is non-linear with temperature changes.

* * * * *

UNITED STATES PATENT AND TRADEMARK OFFICE
CERTIFICATE OF CORRECTION

PATENT NO. : 4,459,467
DATED : July 10, 1984
INVENTOR(S) : Duward Bare and George Dixey It is certified that error appears in the above-identified patent and that said Letters Patent are hereby corrected as shown below:

Column 2, line 44 - "response" should be corrected to read "responsive".

Column 6, claim 3, line 4 - after "switch" insert "of".

Column 6, claim 3, line 20 - insert "i" in "switch"

Signed and Sealed this

Twenty-seventh Day of November 1984

[SEAL]

Attest:

GERALD J. MOSSINGHOFF

Attesting Officer     Commissioner of Patents and Trademarks